United States Patent Office 3,401,220
Patented Sept. 10, 1968

3,401,220
METHODS OF KILLING PESTS SELECTED FROM THE GROUP CONSISTING OF MITES AND INSECTS WITH PHOSPHONOTHIOATES
Karoly Szabo, Orinda, and David J. Broadbent, San Jose, Calif., assignors to Stauffer Chemical Company, New York, N.Y., a corporation of Delaware
No Drawing. Original application Aug. 7, 1964, Ser. No. 388,303, now Patent No. 3,351,679, dated Nov. 7, 1967. Divided and this application Aug. 15, 1967, Ser. No. 668,736
6 Claims. (Cl. 424—211)

This application is a division of copending application Ser. No. 388,303, filed Aug. 7, 1964, now U.S. Patent No. 3,351,679, granted Nov. 7, 1967.

This invention relates to new and novel phosphonothioates which may be used as insecticides. More specifically, this invention relates to certain new substituted carbamoyl phosphonothioates and dithioates and to the use of such compounds in insecticidal compositions. The compounds are particularly valuable for their insecticidal and miticidal properties.

This invention relates to compounds corresponding to the general formula

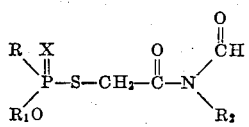

wherein R is a member selected from the group consisting of lower alkyl, lower haloalkyl and phenyl; $R_1$ and $R_2$ are the same or different lower alkyl radicals and X is selected from the group consisting of oxygen and sulfur, and to a method of using and applying said compositions.

The new compounds of the present invention, substituted (N-formyl-N-alkylcarbamoyl methyl) phosphonothioates and dithioates, may be made according to the following general reaction.

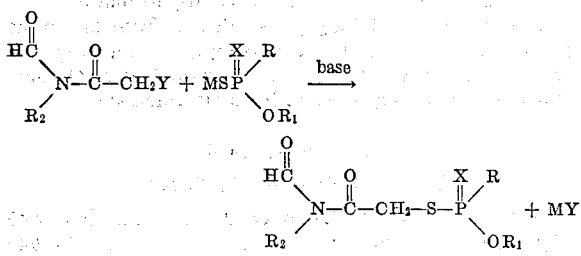

wherein R, $R_1$, $R_2$ and X are members as defined above, Y is a halogen and M is hydrogen, an alkali metal, ammonia or an amine. The reagents in substantially equimolar amounts are reacted in an anhydrous system, either with or without an inert organic liquid or solvent, such as benzene. A basic organic compound is used as a catalyst to facilitate the reaction when M is hydrogen. When preparing the monothioate the reaction can be run for convenience in the aqueous-alcohol system employed in preparing the corresponding phosphonothioate salt. It is possible for the phosphonothioate salt to be isolated and the reaction carried out in an anhydrous system.

The method of preparing the compounds of the present invention as well as the manner of using them in insecticidal and acaricidal compositions is illustrated further in the following non-limiting examples.

EXAMPLE 1

Preparation of 2 - (O - ethyl - ethylphosphonodithioyl) acetyl-N-methylformamide.—O - ethyl - ethylphosphonodithioic acid (8.5 g., 0.05 M), chloroacetyl-N-methylformamide (6.7 g., 0.05 M) and 40 ml. of benzene were placed in a reaction flask equipped with a reflux condenser, stirrer, thermometer and dropping funnel. Triethylamine (5.1 g.) was added dropwise to the vigorously agitated solution. A spontaneous and exothermic reaction followed. The temperature increased to 40° C. accompanied by an almost instantaneous precipitation of the triethylamine hydrochloride. Within 10 minutes the addition was completed, then the mixture was refluxed for 15 minutes, allowed to cool and filtered. The theoretical amount of amine hydrochloride was recovered. The filtrate was washed with 5% sodium bicarbonate solution and water successively. After drying over anhydrous magnesium sulfate the volatiles were stripped at reduced pressure. There was obtained 13 g. (97%) yield of a yellow liquid product with a refractive index of 1.5495 at 25° C.

EXAMPLE 2

Preparation of 2 - (O - ethyl - ethylphosphonothioyl) acetyl-N-ethylformamide.—O - ethyl - ethylphosphonochloridothioate (10.35 g.) was taken up in 30 ml. of ethyl alcohol and 12 ml. of water. A solution of potassium hydroxide (6.7 g.) in 6 ml. of water was added to the mixture in five portions, each time allowing the rising temperature to stabilize. When the addition was complete the solution was heated at 70° C. for one hour. The chloroacetyl-N-ethylformamide (7.5 g.) was added to the water-alcohol solution. The mixture was brought to reflux for 30 minutes and then cooled. The mixture was poured into 50 ml. of water. A pale yellow oil separated. The aqueous portion was extracted three times with 20 ml. of benzene each time. The organic phases were combined and dried over anhydrous magnesium sulfate. The volatile material was removed in vacuo. There was obtained a light yellow oil as product having a refractive index of 1.4925 at 25° C.

The following is a table of the compounds prepared according to the above described procedure. Compound numbers have been assigned to each compound and are used throughout the balance of the application.

TABLE I

| Compound Number | X | R | $R_1$ | $R_2$ | M.P. or $n_D^{25}$ |
|---|---|---|---|---|---|
| 1* | S | $C_2H_5$ | $C_2H_5$ | $CH_3$ | 1.5495 |
| 2 | S | $ClCH_2$ | $C_2H_5$ | $CH_3$ | 1.5488 |
| 3 | S | $C_6H_6$ | $C_2H_5$ | $CH_3$ | 1.5680 |
| 4 | S | $C_2H_5$ | $CH_3$ | $CH_3$ | 1.5515 |
| 5 | S | $C_2H_5$ | $i-C_3H_7$ | $CH_3$ | 1.5390 |
| 6 | S | $CH_3$ | $CH_3$ | $CH_3$ | 41° C. |
| 7 | O | $C_2H_5$ | $C_2H_5$ | $CH_3$ | 1.4930 |
| 8 | S | $CH_3$ | $C_2H_5$ | $C_2H_5$ | 1.5398 |
| 9 | S | $CH_3$ | $CH_3$ | $C_2H_5$ | 1.5485 |
| 10 | S | $C_2H_5$ | $C_2H_5$ | $C_2H_5$ | 1.5348 |
| 11* | O | $C_2H_5$ | $C_2H_5$ | $C_2H_5$ | 1.4925 |

*No. 1 prepared in Example 1, No. 11 prepared in Example 2.

As previously mentioned, the herein described compositions produced in the above-described manner are biologically active compounds which are useful and valuable in controlling various pest organisms. The compounds of this invention were evaluated in the following tests.

Miticide evaluation test.—The two-spotted mite, Tetranychus telarius (Linn.), was employed in tests for miticidal activity. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent; the amount of water being sufficient to give concentrations of active ingredient ranging from 0.25% to .0005%. The test suspensions were then sprayed on the infested pinto bean plants. After seven days mortalities of post-embryonic, nymphal and ovicidal forms were determined. The percentage kill was determined by comparison with control plants which had not been sprayed with the candidates. The LD–50 value was calculated using well known procedures. The LD–50 values for two-spotted mite are reported under the columns "PE," "Nymph" and "Eggs" in Table II below.

Insecticidal evaluation test.—Four insect species were subjected to evaluation tests for insecticides incorporating the compounds of the percent invention.

(1) German cockroach—*Blatella germanica* (Linn.)—(designated GR).

(2) American cockroach—*Periplaneta americana* (Linn.)—(designated AR).

(3) Spotted milkweed bug—*Oncopeltus fasciatus* (Dallas)—(designated MWB).

(4) Housefly—*Musca domestica* (Linn.)—(designated HF).

The procedure for the insects was similar to the acaricidal testing procedure. Test insects were caged in cardboard mailing tubes 3⅛" in diameter and 2⅝" tall. The mailing tubes were supplied with cellophane bottoms and coarse mesh nylon tops. Each cage was provided with food and water. From ten to twenty-five insects were employed per cage. The caged insects were sprayed with the active candidate compound at various concentrations. Final mortality readings were taken after seventy-two hours.

Housefly evaluation tests differed in the following manner. The toxicant was dissolved in a volatile solvent, preferably acetone, the active compound was pipetted into a petri dish bottom, allowed to air dry and placed in a cardboard mailing tube. Twenty-five female flies, three to five days old, were caged in the tube. The flies were continuously exposed to the known residue of the active compound in the cage. After twenty-four and forty-eight hours, counts were made to determine living and dead insects. The LD–50 values were calculated using well-known procedures. The following results were obtained.

TABLE II

| Compound Number | Insecticidal Activity | | | | Acaricidal activity, two-spotted mite | | |
|---|---|---|---|---|---|---|---|
| | HF (μg.) | GR | AR | MWB | PE | Nymph | Eggs |
| 1 | 3 |  | .01 | .030 | .001 | .001 | .010 |
| 2 | 50 |  |  | >.10 | .010 | .050 | >.10 |
| 3 | .1% |  | .1% |  | .010 | .080 |  |
| 4 | .75 | .03 | .03 | .010 | .003 | .010 | .010 |
| 5 | 8 | .1 | .03 | .030 | .010 | .010 |  |
| 6 | 3 | .03 | .01 | .009 | >.01 | >.010 |  |
| 7 | 10 |  |  |  |  |  |  |
| 8 | 3 | .01 |  | .030 | .001 | .003 | .008 |
| 9 | 3 | .03 |  | .030 | .0005 | .003 |  |
| 10 | 10 | .03 |  | .010 |  |  | .008 |
| 11 | 3 | .03 | .03 | .010 | .003 | .004 |  |

From these data it can be seen that these new compounds are valuable insecticides and acaricides. They may also be used in the form of emulsions, non-aqueous solutions, wettable powders, vapors, dusts, and the like, as may be best fitted to the particular utility. The application to a pest habitat of the compounds of the present invention are well known to those skilled in the art.

Various chnges and modifications may be made without departing from the spirit and scope of the invention described herein as will be apparent to those skilled in the art to which it pertains. It is accordingly intended that the present invention shall only be limited by the scope of the appended claims.

We claim:

1. The method of killing pests selected from the group consisting of mites and insects comprising applying to a pest habitat a pesticidally effective amount of a compound correspnding to the formula

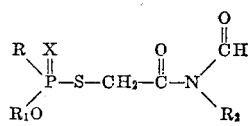

wherein R is a member selected from the group consisting of lower alkyl, lower haloalkyl and phenyl, $R_1$ and $R_2$ are lower alkyl radicals, X is a member selected from the group consisting of oxygen and sulfur.

2. A method of killing pests selected from the group consisting of mites and insects comprising applying to a pest habitat a pesticidally effective amount of 2-(O-ethyl-ethylphosphonodithioyl) acetyl-N-methylformamide.

3. A method of killing pests selected from the group consisting of mites and insects comprising applying to a pest habitat a pesticidally effective amount of 2-(O-methyl-ethylphosphonodithioyl) acetyl-N-methylformamide.

4. A method of killing pests selected from the group consisting of mites and insects comprising applying to a pest habitat a pesticidally effective amount of 2-(O-methyl-methylphosphonodithioyl) acetyl-N-methylformamide.

5. A method of killing pests selected from the group consisting of mites and insects comprising applying to a pest habitat a pesticidally effective amount of 2-(O-methyl-methylphosphonothioyl) acetyl-N-ethylformamide.

6. A method of killing pests selected from the group consisting of mites and insects comprising applying to a pest habitat a pesticidally effective amount of 2-(O-ethyl-ethylphosphonothioyl) acetyl-N-ethylformamide.

References Cited

UNITED STATES PATENTS 3,057,774  10/1962  Baker et al. _____ 260—943
3,176,035   3/1965  Lutz et al. _____ 260—943

ALBERT T. MEYERS, *Primary Examiner.*

S. J. FRIEDMAN, *Assistant Examiner.*